United States Patent
Tormasov et al.

(10) Patent No.: US 7,293,033 B1
(45) Date of Patent: Nov. 6, 2007

(54) SYSTEM AND METHOD FOR PROVIDING EFFECTIVE FILE-SHARING IN A COMPUTER SYSTEM TO ALLOW CONCURRENT MULTI-USER ACCESS

(75) Inventors: Alexander Tormasov, South San Francisco, CA (US); Stanislav Protassov, Singapore (SG); Serguei Beloussov, South San Francisco, CA (US)

(73) Assignee: SWsoft Holdings, Ltd. (BM)

( * ) Notice: Subject to any disclaimer, the term of this patent is extended or adjusted under 35 U.S.C. 154(b) by 483 days.

(21) Appl. No.: 10/691,066

(22) Filed: Oct. 21, 2003

Related U.S. Application Data

(63) Continuation of application No. 10/401,636, filed on Mar. 27, 2003, now abandoned.

(60) Provisional application No. 60/367,951, filed on Mar. 27, 2002.

(51) Int. Cl.
*G06F 17/30* (2006.01)

(52) U.S. Cl. .......................... 707/101; 707/3; 707/10; 707/9; 707/200; 707/100

(58) Field of Classification Search .................. 707/3, 707/100, 10, 200–205, 9, 101, 102; 713/200
See application file for complete search history.

(56) References Cited

U.S. PATENT DOCUMENTS

| | | | | |
|---|---|---|---|---|
| 5,313,646 A | * | 5/1994 | Hendricks et al. | 707/101 |
| 5,706,510 A | * | 1/1998 | Burgoon | 707/203 |
| 5,724,578 A | * | 3/1998 | Morinaga et al. | 707/100 |

(Continued)

OTHER PUBLICATIONS

Article: "Union Mounts in 4.4BSD-Lite" 9 pages, Authors: Jan-Simon Pendry, Sequent UK; Marshall Kirk McKusick, (1995).

(Continued)

*Primary Examiner*—Cam Y T Truong
(74) *Attorney, Agent, or Firm*—Bardmesser Law Group

(57) ABSTRACT

A computer system that allows for multiple users that each have access to shareable files. In one exemplary embodiment, each user has a user file tree that corresponds to the shareable file tree and initially contains links or pointers to selected shareable files. Each user also has a private file area to store files. If a user wishes to access a shareable file to perform an action that does not modify the shareable file, then the user file tree will point to the shareable file and allow the user to access the file. On the other hand, if the user wishes to access a shareable file and perform an operation that modifies the shareable file, the computer system will make a copy of the shareable file and place the copy in the user's private file area. Next, the computer system will modify the user's file tree such that the link that pointed to the shareable file now points to the copy of the shareable file that was placed in the user's private file area. The user is then able to access the copy and may modify the copy. Because each user's private file area is not publicly available, any changes made by this user are not visible to any other user.

20 Claims, 5 Drawing Sheets

U.S. PATENT DOCUMENTS

| | | | | |
|---|---|---|---|---|
| 5,832,527 | A | * | 11/1998 | Kawaguchi ................. 707/205 |
| 5,905,990 | A | | 5/1999 | Inglett |
| 6,044,465 | A | * | 3/2000 | Dutcher et al. ................ 726/13 |
| 6,260,040 | B1 | * | 7/2001 | Kauffman et al. ............ 707/10 |
| 6,289,356 | B1 | | 9/2001 | Hitz et al. |
| 6,418,466 | B1 | * | 7/2002 | Bertram et al. ............. 709/221 |
| 6,560,613 | B1 | | 5/2003 | Gylfason et al. |
| 6,571,245 | B2 | * | 5/2003 | Huang et al. ................. 707/10 |
| 6,618,736 | B1 | | 9/2003 | Menage |
| 6,647,384 | B2 | * | 11/2003 | Gilmour ........................ 707/5 |
| 6,687,741 | B1 | * | 2/2004 | Ramaley et al. ............ 709/206 |

OTHER PUBLICATIONS

Article: 18.3.7—"Implementation Issues and Variations", 1 page, Design Techniques IV, p. 757, (1996).

Article: The Union Mount Filesystem, 1 page, (1996), Section 6.7, Stackable Filesystems, p. 235.

Article: "I/O System Overview", 2 pages, (1996), Chapter 6 pp. 236-237.

Article: "Design Overview of 4.4BSD", 4 pages, (1996), Chapter 2, pp. 36-39.

Article: "Local Filesystem", 12 pages, (1996), Chapter 7, pp. 242-253.

Article: "File Systems" 10 pages, pp. 401-410, (1997).

* cited by examiner

SYSTEM AND METHOD FOR PROVIDING EFFECTIVE FILE-SHARING IN A COMPUTER SYSTEM TO ALLOW CONCURRENT MULTI-USER ACCESS

RELATED APPLICATION DATA

This patent application is a continuation of application Ser. No. 10/401,636, filed Mar. 27, 2003 now abandoned, which claims priority pursuant to 35 U.S.C. § 119(e) to provisional patent application Ser. No. 60/367,951, filed Mar. 27, 2002 and entitled "Method of Using Links to Let Different Users Share a File Tree."

BACKGROUND OF THE INVENTION

1. Field of the Invention

The present invention relates to computer systems and, particularly, to a system and method for providing file sharing in a computer file system to allow for efficient multi-user access.

2. Description of Related Art

Typically, the operating system of a computer system includes a file system to provide users with an interface while working with data on the computer system's disk and to provide the shared use of files by several users and processes. Generally, the term "file system" encompasses the totality of all files on the disk and the sets of data structures used to manage files, such as, for example, file directories, file descriptors, free and used disk space allocation tables, and the like. Accordingly, end users generally regard the computer file system as being composed of files and a number of directories. Each file usually stores data and is associated with a symbolic name. Each directory may contain subdirectories, files or both. The files and directories are typically stored on a disk or similar storage device.

Operating systems such as UNIX, Linux and Microsoft Windows manage computer file systems by defining a file object hierarchy. A file object hierarchy begins with a root directory and goes down the file tree. The file address is then described as an access path, e.g., a succession of directories and subdirectories leading to the file. This process of assigning a file address is called access path analysis or path traverse. For instance, the path "/r/a/b/file" contains the root directory (/), subdirectories "r", "a" and "b" and then the file. Typically, the processes within an operating system interact with the file system with a regular set of functions. For example, these functions usually include open, close, write and other system calls. For instance, a file may be opened by the open functions and this function acquires the file name as a target.

The file system may also include intermediate data structures containing data associated with the file system to facilitate file access. This data is called metadata and may include, for example, data corresponding to the memory location of the files, e.g., where the file is located in the hard drive or other storage medium. For example, in the context of a UNIX operating system, these intermediate data structures are called "inodes," i.e., index-node. An inode is a data structure that contains information about files in UNIX file systems. Each file has an inode and is identified by an inode number (e.g., i-number) in the file system where it resides. The inodes provide important information on files such as user and group ownership, access mode (read, write, execute permissions) and type. The inodes are created when a file system is created. There are a set number of inodes, which corresponds to the maximum number of files the system can hold.

Usually, computer file systems store this intermediate data concerning the location of stored files as separate structures in the same place as the file content is stored. The functions responsible for file searching, implemented in the operating system kernel, for example, first locate the intermediate data and then locate the file data that is sought. Directories may also have intermediate data structures containing metadata. File systems may also generate intermediate file data "on the fly" at the moment when the file system is requesting the file, for example. For instance, the NFS Network file system used by Sun Microsystems of Santa Clara, Calif., provides for on the fly intermediate data creation.

In addition, intermediate data structures may include reference files or links that are associated with or point to other files. When a link is accessed, the link itself is not opened. Instead, only the file to which the link refers is opened. Thus, the intermediate data structure in a link may contain data referring to other files that are not requested. For instance, the intermediate data structure may contain the path to another file that will be found and opened instead of this reference link. There are several types of links or references. For example, references that include a symbolic name of another file are called symbolic links. References that refer to another file's intermediate structure are called hard links. The type of link used is generally determined by the operating modes supported by the operating system.

File systems may provide several functions. As discussed above, the most basic task of a file system is provide access to files. File systems may also enhance system performance with additional functions such as, for example, caching, access markers and fault-tolerance.

The multi-user operating mode of a computer system may generally allow the operating system processes of different users to operate simultaneously. Each process within the operating system is usually associated with information that identifies the user. For instance, in a UNIX system, this information is typically an identifier of the user and group on whose behalf this process is being executed. When accessing a file, the operating system defines the user requesting the file operation and determines whether the operation is permitted for that user. Generally, this determination may be made upon opening the file, e.g., requesting a function of the type "open." Thus, on the basis of this access information, the operating system may organize different views of the same file system tree based upon selected parameters, such as, for example, time, operation type or user information.

To unite different types of computer file systems, these file systems may be mounted. For any directory inside the file system, it is possible to mount another file system into that existing directory. Thus, one tree of the computer file system appears inside another file tree. The operating system uses a specific system call of the operating system kernel to mount a file system. This system call includes at least two arguments: the mounting point, e.g., the directory inside of the current file system, and the file system itself, e.g., the storage device or memory location where the data resides. Depending on the file system, additional information containing parameters of the specific file system types may be included. During analysis of the access path to the selected data file, the operating system defines a moment when the path "passes" through this mounting point and "below" this point, an analysis is performed using operations specific for the given file system. The set of these operations is defined according to the parameters established during the file mounting process.

The UnionFS file system, developed in the FreeBSD UNIX operating system, implements a similar technique. One feature of UnionFS is that each user can have a different view of the tree of the same file. In order to provide this feature, two trees of the file system are built when mounting UnionFS. The first tree is a read-only tree. The second tree is built in during the user's session and is used for auxiliary purposes. This second tree is defined as an additional parameter when mounting.

When calling a file within the shareable tree, a search is performed in two ways. First, the search may be based on a path name that is computed based on the location of the file. For example, the mounting point of UnionFS may be located at "a/b/u," and the file to be addressed may be at "/a/b/u/c/d/e." The second tree, mounted to the same point, is located starting from the address "/x/y/." Then an additional address is computed as "/a/b/u/c/d/e" minus "/a/b/u" plus "/x/y/." As a result, the additional address is computed as "/x/y/c/d/e."

Thus, the specific intermediate data structure (e.g., inode) is searched using the computed path name. If the specific intermediate data structure (inode) is found, then it is assumed that the file is found and the requested operation will be performed on this file. If the file is not found, then a second search by the direct address is provided. If the file is not found there either, the system returns the corresponding error code. Otherwise, the system acts according to the requested operation. If the file opens in response to an operation to modify its content or associated data, then the file is first copied to the computed address as described above, and the operation is performed on the new copy. Otherwise, the operation is performed on the file located in the shareable tree by the requested address.

One way to change the search address of the file object, and, accordingly, the position of the root file system for a group of processes, is to use a primitive that is analogous to the OS UNIX kernel primitive "chroot." The operation of this primitive is based on the principle of shifting the real root of the file system or "root" directory to some location for a selected group of processes, for instance, for all processes of one user. Then all file operations inside this process kernel are performed only within the sub-tree of the selected file system.

Another example of this type of system is one based upon "snaps" of the file system, or tree snapshots, in which modifications to the entire file system are chronologically arranged. All modifications made in the file system or any of its parts during a period of time are saved in a separate tree of the file system. Such separate chronologically arranged trees represent the complete history of file system modifications for a discrete period of time. Thus, to determine the file state at a fixed moment of time, the operator searches for the file in the most recently accessed file tree. If the file is not located, then the previous tree is searched.

Similarly, the Mirage File System (MFS) from IBM of Armonk, N.Y., describes a system consisting of a number of trees and a specific file search mechanism that depends on the file type, extension and sequence of requests, among other parameters. One of the principles of this computer file system is the substitution of the file search path whereby the search path is expanded to other file system locations associated with the file object being searched. For example, this system offers an implementation of a system of snapshots.

U.S. Pat. No. 6,289,356 also describes an example of implementation of specific intermediate data structures, in which the file system is organized with a strictly regulated mode of modifications records. The disclosed system provides the transition of file system states so that, at any moment of time, the system is in the correct state. Additionally, the system creates snapshots of the file system through doubling an intermediate data structure (e.g., inode) without doubling the files themselves. The system also marks the files chosen to store data file blocks as belonging to some snapshot of the file system. This provides interference with file system functioning at the level of data distribution algorithms.

A robust file system is especially important in multi-user systems, such as, for example, virtual server systems. A virtual server is a server, for example, a Web server, that shares computer resources with other virtual servers. In this context, the term virtual indicates that the virtual server is not a dedicated server—the entire computer is not dedicated to running the server software. Virtual computer systems have several applications. For example, virtual web servers are a very popular way of providing low-cost web hosting services. Instead of requiring a separate computer for each server, dozens of virtual servers can co-reside on the same computer. In most cases, performance is not affected and each web site behaves as if it is being served by a dedicated server. However, if too many virtual servers reside on the same computer, or if one virtual server starts utilizing an excessive amount of resources, applications such as Web pages, for example, will be delivered more slowly.

In addition to maintaining efficient allocation of resources, providing multi-user access involves other considerations as well, including security, avoiding file corruption and maximizing system efficiency. Accordingly, it is desirable to provide a file system that provides multi-user access but avoids the danger of file corruption, provides security, allows scalability and facilitates the efficient use of limited system resources.

SUMMARY OF THE INVENTION

The present invention relates to a system and method for providing a file system that provides efficient multi-user access and file sharing.

More particularly, in an exemplary embodiment of the present invention, the computer system includes a shareable file tree corresponding to the shareable files in the system. The computer system allows for multiple users that each have access to the shareable files. Each user has a user file tree that corresponds to the shareable file tree and initially contains links or pointers to each shareable file. Each user also has a private file area to store files. If a user wishes to access a shareable file to perform an action that does not modify the shareable file, then the user file tree will point to the shareable file and allow the user to access the file. On the other hand, if the user wishes to access a shareable file and perform an operation that modifies the shareable file, the computer system will make a copy of the shareable file and place the copy in the user's private file area. Next, the computer system will modify the user's file tree such that the link that pointed to the shareable file now points to the copy of the shareable file that was placed in the user's private file area. The user is then able to access the copy and may modify the copy. Because each user's private file area is not publicly available, any changes made by this user are not visible to any other user. As a result, the present system and method allows for multiple users to access and modify shareable files without incurring the risk of file corruption, excessive overhead or compromising system security, among other advantages.

A more complete understanding of the present system and method to provide file sharing in a computer system to allow multi-user access will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention is directed to a system and method for providing a file system to allow multi-user access. In particular, the present invention includes using links or pointers to allow multiple users to access a common system file tree, including files relating to the operating system configuration and user services. Accordingly, every user may modify its files, independent of the access moment and the presence or absence of other users, such that the modifications are only visible to the user that changes the file. In the detailed description that follows, like element numerals are used to describe like elements illustrated in one or more of the figures.

Figure 1:
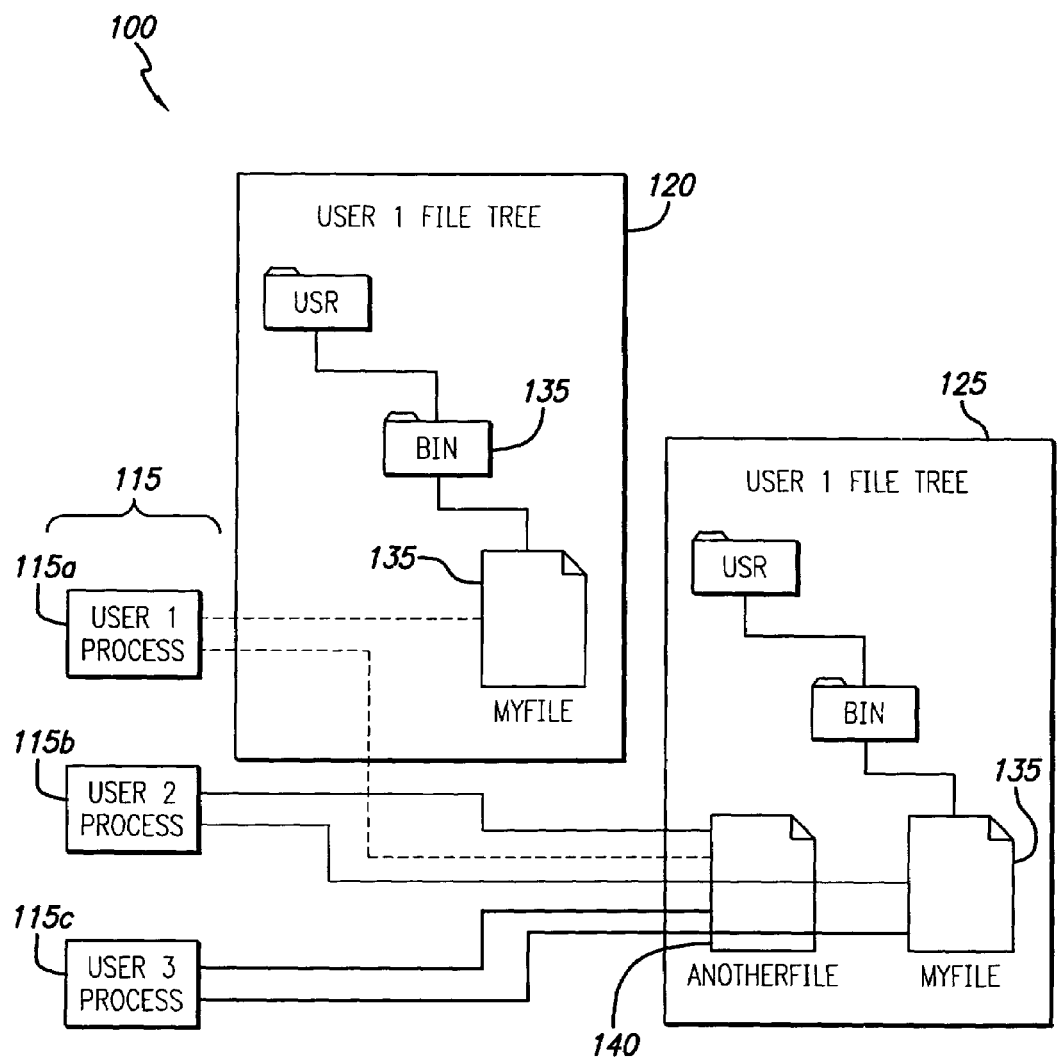
FIG. 1 illustrates file visibility to different users in an exemplary embodiment of the computer system of the present invention.

As discussed above, the present invention is directed to a system and method for accessing a common file system associated with a computer system that provides for multi-user access. FIG. 1 illustrates an exemplary embodiment of the computer system of the present invention, indicated generally at 100, and user access thereto. Computer system 100 includes a shared file tree 125 that is associated with the files that may be shared or accessed by the users of computer system 100. Computer system 100 allows for multiple users 115a-c, referred to as Users 1, 2 and 3, respectively. Although three users are depicted in FIG. 1, it should be understood that computer system 100 may be configured to accommodate more users. Each user 115 has access to the shareable file tree 125. Accordingly, as discussed above, each user may share the file tree 125 to provide multi-user access of the file system of computer system 100.

In addition, each user 115 is associated with a user file tree 120. Each user 115 may access shareable file tree 135 via its own copy of user file tree 120. From the user's point of view, user file tree 120 is transparent and tracks the structure of shareable file tree 125, as discussed below. As a result, user file tree 120 allows each user 115 to access files located in shareable file tree 125, including files relating to operating system configuration and user services. Each user file tree 120 is private and preferably may not be accessed by other users without administrative privileges. Accordingly, as discussed below, every user 115 is able to modify its files independent of the other users. As a result, any user 115 is able to access and modify a file regardless of when other users are present on the system or access the file. These modifications to a file are only visible to the user that authored the changes. For example, as shown in FIG. 1, the file entitled "myfile," shown at 130, has a file path "/usr/bin/myfile" on shareable file tree 125. If User 1, shown at 115a, accesses myfile 130 via file path /usr/bin/myfile and modifies this file 130, then the other users, e.g., users 115b and 115c, that access myfile 130 via this same path, e.g., /usr/bin/myfile, only see the original, unchanged file 130. The modified file, shown at 135, is only visible to the user that authored the modified file, e.g., User 1, and may only be accessed via User 1's file tree 120. Similarly, other files that have not been changed will be visible to all users in its original form. For example, "anotherfile," shown at 140, has not been modified by User 1. Accordingly, all users 115 that access the file via the file path /usr/bin/anotherfile will access the file from shareable file tree 125 and view the same, unaltered, file. As a result, multiple users may access and modify shared files without the risk of corrupting the original files.

In conventional multi-user computer systems, restricting access to modified files to the author is generally implemented through directly copying the file system tree for each user. But, as discussed above, this solution requires a great deal of overhead to accommodate multiple copies of the same files for each different user. As a result, this conventional solution is not always possible or efficient due to the additional storage and processing requirements and the adverse effect on system performance.

In contrast, as discussed below, the present invention utilizes specific link files or pointers to provide multi-user access while minimizing the risk of file corruption. Generally, as discussed above, a link is a specific file type that serves as a reference to other files. Accordingly, upon receiving a request, the link or reference file readdresses the request to another file. Thus, when a link is accessed, the link itself is not opened, but rather, the file to which the link refers is opened. Thus, the intermediate data structure in a link may contain data referring to other files that were not requested. For instance, the intermediate data structure may contain the path to another file that will be found and opened instead of this reference link.

Figure 2:
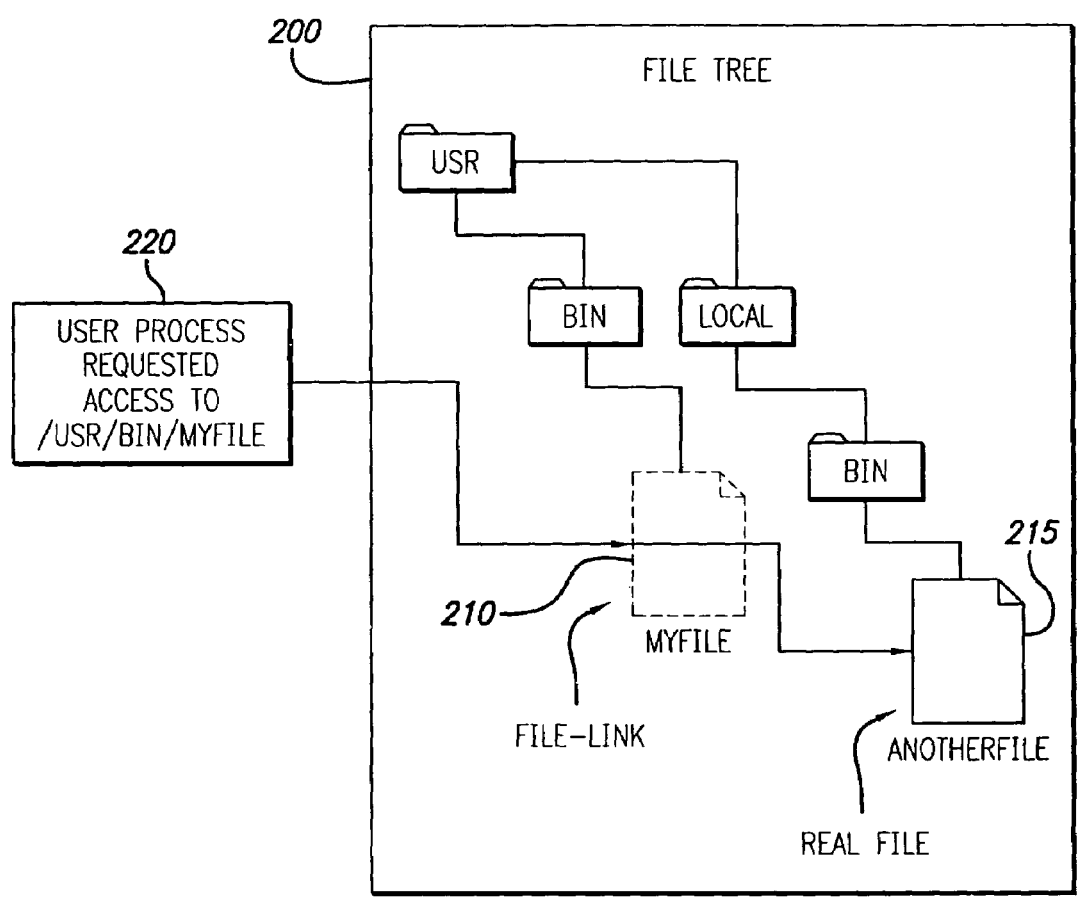
FIG. 2 illustrates requested access to a non-link file in accordance with an exemplary embodiment of the present invention.

For example, in reference to FIG. 2, "myfile" 210, located at path /usr/bin/myfile in file tree 200, is a link file that points to "anotherfile" 215. Accordingly, if user process 220 attempts to open myfile 210, the process will instead open anotherfile 215. The operation of a link file is generally transparent to the user. Thus, a user will not be able to determine that the file is in fact a link file, rather than the actual file the user is attempting to open, absent a specific request, if at all.

Figure 3:
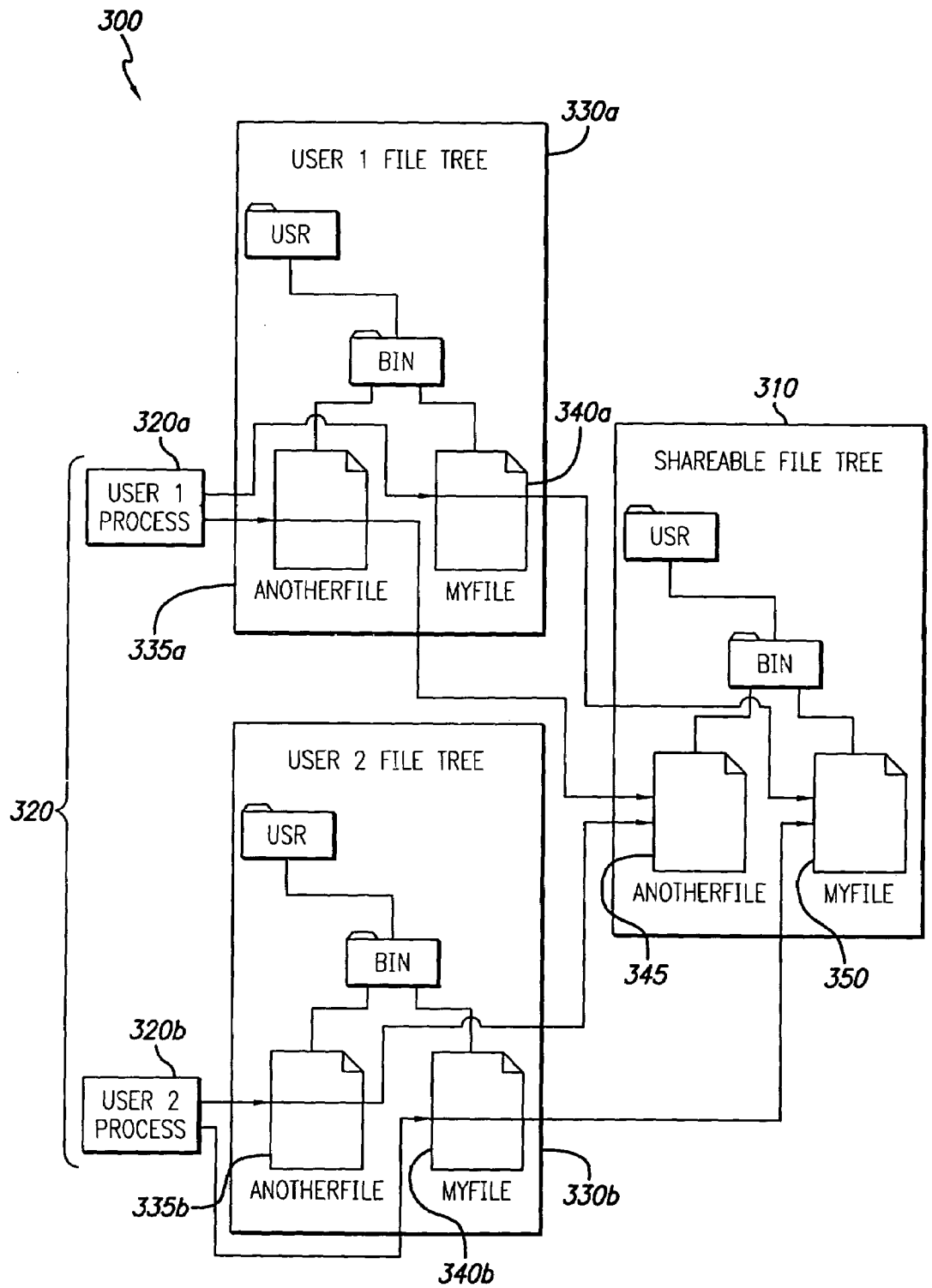
FIG. 3 illustrates the initial state of the user file area in accordance with an exemplary embodiment of the present invention.

FIG. 3 shows an exemplary embodiment of the computer system of the present invention, shown generally at 300. As discussed above, computer system 300 includes a shareable file tree, indicated at 310. In addition, computer system 300 allows multiple users, shown at 320, to access shareable file tree 310. The multi-user mode of computer system 300 may generally allow the operating system processes of different users to operate simultaneously. Each process within the operating system is usually associated with information that identifies the user. When accessing a file, the operating system defines the user requesting the file operation and determines whether the operation is permitted for that user. Generally, this determination may be made upon opening the file, e.g., requesting a function of the type "open." Thus, on the basis of this access information, the operating system may organize different views of the same file system tree based upon selected parameters, such as, for example, time, operation type or user information.

Each user 320 that has access to the computer system's shareable file tree 310 also has its own user file tree 330 that contains a directory structure analogous to the shareable file tree 310. But instead of containing a copy of the actual file residing in shareable file tree 310, user file tree 330 contains a link to the corresponding actual file in shareable file tree 310. For example, initially, files 335*a* and 340*b* are not copies of the analogous files in shareable file tree 310, files 345 and 350, respectively. Instead, files 335 and 340 are link files to actual files 345 and 350. Accordingly, as discussed above, each user 320 accesses the actual file through its user file tree 330, which, in turn, links to the actual file in the shareable area. From the user's point of view, this operation is implemented transparently—the user 320 cannot see the location to which the link or pointer is directed when it addresses a file. In an alternate exemplary embodiment, the user may discover the actual address of the actual file or link only if such feature is specifically provided by the operating system.

Figure 4:
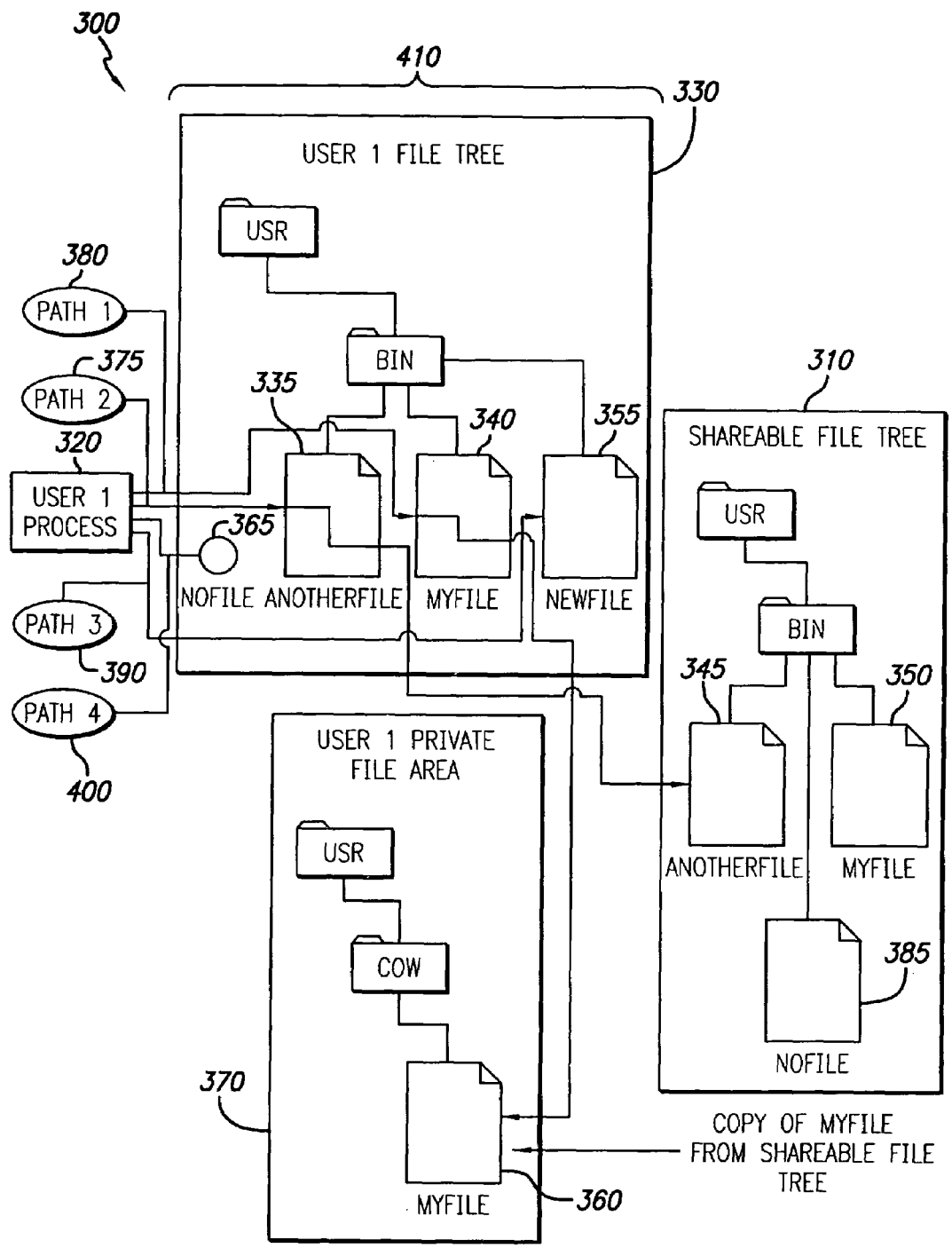
FIG. 4 illustrates an exemplary embodiment of the user file area.

FIG. 4 shows another exemplary embodiment of the present invention. Computer system 300 includes a shareable file tree 310. Shareable file tree 310 includes several shareable files, including "anotherfile" 345 and "myfile" 350. System 300 also includes a user file area 410. Each user 320 has access to its own user file tree 330 that may be located in user file area 410. As discussed above, user file tree 330 contains files that correspond to files in shareable file tree 310. Accordingly, user file tree 330 includes "anotherfile" 335 and "myfile" 340 that correspond to files 345 and 350 in shareable file tree 310, respectively. But, as discussed above, user file tree 330 does not contain copies of the corresponding files in shareable file tree 310, only links. Accordingly, until the user attempts to modify the files, as discussed below, files 335 and 340 are initially links to actual files 345 and 350.

Generally, all file operations may be subdivided into two categories: (1) operations that modify the file content or its associated data; and (2) all other operations, e.g., operations that only access the file. If the user process 320 does not request a file operation that modifies the file contents of a file located in shareable file tree 310, system 300 unconditionally opens the file pointed to by the link. For example, as shown in FIG. 4, user 310 may request to access, and not modify, anotherfile 345. As shown by Path 2, indicated at 375, user 310 will open anotherfile 335, the link to the actual anotherfile 345, and be permitted to access this actual file 345 Further operations with anotherfile 345 may be subsequently performed as usual.

On the other hand, if the user operation attempts a modification of any information parameters associated with the file, e.g., its content or length, then system 300 first defines the link points, e.g., to the original file in shareable file tree 310, or elsewhere. In order to allow users to modify file system data, each user receives its own private file area, indicated at 370 in FIG. 4, that may be located in the user file area 410. Private file area 370 may be a selected memory or storage location in or accessible to system 300. In the event that a user 320 wishes to perform an operation that modifies a shareable file in shareable file tree 310 for which the user's file tree 330 contains a link that points to this shareable file, system 300 first copies the shareable file into the user's private file area 370. Next, system 300 modifies user file tree 330 so that the link associated with the shareable file no longer points to the location in shareable file tree 310, but instead points to the location of its copy in user's private file area 370. Thus, system 300 performs a user-transparent operation to allow a user to modify a shareable file without incurring the risk of sharable file corruption.

For example, as shown in FIG. 4, user 320 may wish to access and modify "myfile" 350 located in shareable file tree 310. Because user 320 wishes to modify the file, system 300 will not allow user 320 to directly access and modify the actual shareable file 350. Instead, system 300 will copy the shareable myfile 350 to the user private file area 370. As a result, private file area 370 now contains a copy of the original shareable myfile, shown at 360. Next, system 300 modifies the associated link file, "myfile" 340, located in user file tree 330, to point to copy 360 instead of the original file 350 located in shareable file tree 310. As shown by Path 1, indicated at 380, instead of accessing the original file, user 320 will instead access the link file 340 to open the copy 360 stored in the user's own private file area 370. User 320 is now free to modify copy 360 as usual. Any modifications made to this copy 360 of myfile 350 by this user will not be viewable to other users of system 300.

Note that private file area 370 and user file tree 330 may be configured to be accessible to a selected set of users, e.g. a group of users associated with the underlying operating system, rater than just a single user. Note that user 320 may place files into private file area 370 that do not contain links, e.g., pointers to shareable file tree 310. Moreover, user file tree 330 may contain metadata to optimize user access. For example, the links located in user file tree 330 may contain metadata concerning the user's access to the corresponding shareable file. For example, the metadata may allow a user to define permission to files stored in the shareable file tree without copying the files into the private file area 370.

If the link file in user file area 330 already points to a file copy in private file area 370, then the operation will be performed on the copy without any change in user file tree 330. For instance, if user 320 wishes to continue modifying myfile copy 360, as discussed in the above example, then user 320 will access myfile copy 360 via myfile link 340, as shown by Path 1, indicated at 380. Therefore, any further operations with myfile copy 360 will also be transparent to user 320.

User 320 may also freely create new files within system 300. If a user 320 requests the creation of a new file, the new file will be created only in the specific private file area 370 or 410. For example, in the exemplary embodiment shown in FIG. 4, user 320, e.g., User 1, wishes to create a new file, e.g., a file not present in shareable file tree 310, entitled "newfile." System 300 preferably allows the user to create this new file, shown as newfile in 410, only in the user's own data area associated with user file tree 330. Accordingly, user 320 may directly access newfile 355, e.g., via file path /usr/bin/newfile, as shown by Path 3, indicated at 390. Accordingly, in a preferred exemplary embodiment, only the user that authored the new file may access or view the new file. In this example, newfile 355 is preferably not viewable to any other user, except User 1. In an alternative embodiment, system 300 may create the new file in the user private file area 370 and modify user file tree 330 to include a link file that points to the new file in user private file area 370. User 320 may now access the new file via the associated link in user file tree 330.

User 320 may also delete files within system 300. If the user requests an operation to delete a file that has a link pointing to the shareable data area, then only the pointer will be deleted. The original file and its associated data will be unaffected and accessible by other users. For example, in the exemplary embodiment shown in FIG. 4, user 320, e.g., User 1, wishes to delete the shareable file entitled "nofile" 375 located in shareable file tree 310. Instead of deleting the shareable file, system 300 will instead delete the corresponding link file, nofile 365, located in User 1's own file tree 330, as shown by Path 4, indicated at 400. Once the link file 365 has been deleted, User 1 will not be able to view or access nofile 385, absent intervention by the system administrator, for example. Accordingly, from User 1's point of view, nofile 385 has been deleted, even though it is still available to all other users.

If the user requests deletion of a file that has a link pointing to a copy located in the user's private file area 370, then both the pointer itself and the file copy will be deleted. For example, if User 1 wishes to delete the modified "myfile" 360, then both the link file 340 and the copy 360 will be deleted. If the user requests the deletion of a file that is not a pointer file and that is located in a specific private data area, e.g., private file area 370, then that file will be deleted as usual. As discussed above, a user's decision to delete a file will not affect another user's existing ability to access a file.

Figure 5:
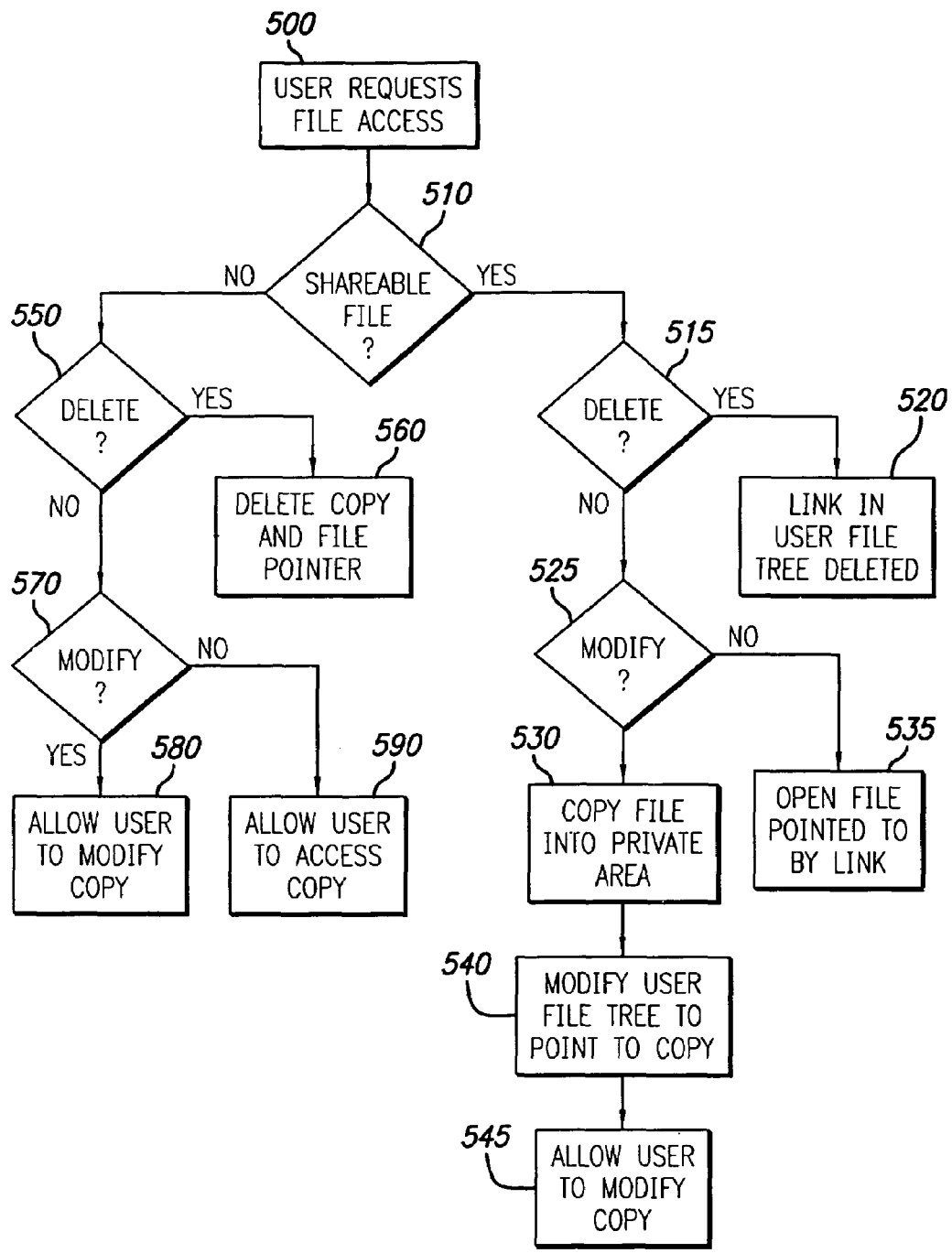
FIG. 5 illustrates an exemplary embodiment of the method of the present invention.

FIG. 5 illustrates an exemplary embodiment of the method of the present invention. At step 500, the system receives a user request to access a file. At step 510, it is determined whether the requested file is a shareable file located in the shareable file tree or a private file. If it is determined that the file is a shareable file, then, at step 515, it is determined whether the user wishes to delete the file. If so, then the link to this file located in the user's file tree is deleted—not the shareable file—at step 520. Otherwise, it is determined at step 525 whether the user wishes to modify the shareable file. If not, then at step 535, the user may access the shareable file via the user file tree. On the other hand, if the user wishes to modify the shareable file, then the system copies the shareable file to the user's private file area, at step 530, modifies the user file tree to point to this copy, at step 540, and then allows the user to modify the copy (not the original shareable file) at step 545.

If it is determined at step 510 that the user wishes to access a private file, then it is determined at step 550 whether the user wishes to delete the private file. If so, the system deletes both the file copy and any associated pointer file. If the user merely wishes to modify the file, at step 570, then the system allows the user to directly modify the private file at step 580. On the other hand, if the user only wishes to access the file, then at step 590, the user is allowed to access the private file.

The system and method of the present invention manages access such that all modifications made by one user in any file of the shareable file tree 310 are independent from the actions of other users and are visible only to the user making the modifications. As discussed above, file manipulation is implemented in the operating system by utilizing links in the file system. Generally, access to files in a file system is provided through specific intermediate data structures, e.g., inode. These intermediate data structures contain information associated with the file, such as, for example, where the file data may be found on the disk or the time of the last file modification.

As discussed above, in order to provide this type of access, the computer system creates two directories for each user: a first directory to repeat the structure of the shareable tree to store links to files, e.g., user file tree 330, and a second directory to store files copied from the common area, e.g., private file area 370. In one exemplary embodiment, these directories are implemented using a mounting system call that has the required directories as a parameter. During analysis of the access file path, the system will determine when the access path passes in the sub-tree accessible through the mounting point. The appropriate software then controls access to the files inside the directory.

Thus, when searching for a file via the access path, an analysis of the access path is initially provided and the algorithm determines whether this path intersects any mounting point. If the path intersects the mounting point of the described file system, the processing is performed according to the principles described above. Therefore, the algorithm determines the address within its own private tree of the file system and searches for an intermediate data structure used to access an object. If the structure is not found, the file is considered absent. If the structure is found, then that structure is used to determine the type of file object, and, depending on this type of file object, the algorithm either enables operation on the data pointed to with the file, or provides readdressing to another file, if the file is a link file. If at least one of those structures is not located, the file is considered to be absent.

As discussed above, similar data structures can be created "on the fly" during interaction with the file system. In this case, these structures are stored only in the random access memory of a computer or in its cache, rather than on the hard drive or similar storage device. For example, those structures created on the fly may be stored in the temporary buffer data area on the disk or in RAM, or any other similar memory location.

In order to provide security and system integrity, it is preferable that the computer system limit the extent to which users may mark files, such as creating a specific mark. Generally, the creation and characteristics of a specific mark depends on the underlying file system. For example, for a Linux system, a special file flag, e.g., a sticky bit, may be used as a specific mark because this flag is not used by standard file systems for symbolic links. In other file systems, e.g., Windows NTFS, for example, the system can use other techniques to mark files.

Typically, a specific mark may be a standard link or pointer of the underlying file system. For example, a specific mark may be a symbolic link in a Unix file system. In this case, a user can create its own symbolic links using standard OS interface. These user-created links are distinguishable from the system's own pointers. But, if the system allows normal users (e.g., rather than just system administrators) to create such links, the user can accidentally or intentionally create a link pointed to some critical system files that may compromise system security. For instance, the user may create a link to a "/etc/shadow" file that contains encrypted passwords for the system. Accordingly, the system should not allow users to mark files accessed via "mounted" points. Therefore, these links should only be created at the direct access to the private user area by means of the underlying file system, and the access path should not contain the mounting point of the file system being described.

For example, the system should allow creation marks for files from "/vz/private" directory tree, but should not allow creation of such marks for files from the "/vz/root" directory tree. Note that in an exemplary embodiment of the present invention, the chroot function may be used to move root file systems for a particular user or set of users into predefined locations and prevent users from accessing unauthorized sections of the file system. Usually, the mounting point of the mentioned file system is used to provide access through utilization of the chroot primitive, e.g., the procedure of changing the root of the file system. Its functioning is based on the principle of shifting the file system real root or "root" directory to any selected location. For example, the root directory may be moved to the mounting point of the file system for a certain group of processes, such as, for instance, for all processes of a user. Consequently, all file operations associated with the user processes within the mentioned file system are handled with the transparent substitution of files, as discussed above. As a result, the user then has no opportunity to explicitly create pointer files having specific marks as interpreted by the file system.

For example, in a virtual environment, users may be restricted to use only a mounted tree, rather than the actual underlying file system. In this case, if the "chroot" function is applied to "/vz/root" for user processes, users will be unable to create such pointers because the file system will be accessed using "/vz/root." As discussed above, this is advantageous from a security point of view.

Note that, as discussed above, the present invention does not require a mounting system call, but rather, the present invention may utilize mounting system calls in an exemplary embodiment of the invention. Moreover, the present invention does not require the creating of a mounting point when the user modifies a file (and creates a copy in its private file area). The file system of the present invention may use a single mount point to combine two known file trees (such as, for example, "/vz/private" as a private area and "/vz/template" as a common shared read-only area) into a new, combined tree (for example, into "/vz/root" where all files from /vz/template and /vz/private appear from the user point of view). Accordingly, to create such an area, the system may use a single mount call with these two trees as parameters. After the creation of this mount point, this combined tree will be usable by the user, and all access to files using this path (for example, to file "/vz/root/etc/passwd") will be handled by the file system driver because the path traverse operation will cross /vz/root/. All copy-on-write and other link-related operations will be performed by the file system driver and no additional mount operations are required.

To modify the content of the shareable area of the file tree so that all changes become visible to all users having access to the area according to the described schema, it is necessary to modify the above-mentioned shared tree, create specific links to the new files for all users of the system having their own private areas, and delete those links that point to non-existent files. It may also be necessary to create additional directories in these private areas. For example, to make a change visible, the administrator or user itself should call a special procedure that will create such a link in the user private area. This link will point to the shared area, and typically it is transparent for the user. The special procedure may usually create a normal "standard" link on the underlying file system, and later mark it as a "magic" link using some special OS interface implemented by a file system driver or OS kernel.

The present system and method provides a number of advantages over conventional file systems. For example, unlike the UnionFS file system discussed above, the present invention uses links instead of implicit computations of the new file address by its path. Moreover, in the UnionFS file system, a new file appearing in the shareable tree will become visible to all users at once. In the present invention, this file is invisible, because it explicitly creates a link to the new file for each user. Accordingly, among other advantages, the presently disclosed file system provides greater flexibility, simplifies maintenance and provides greater safety by avoiding the risk of file corruption, for example. For example, if a single user makes a mistake during an upgrade procedure, all users under the UnionFS system will be adversely affected. In contrast, in the present invention, the harm may be minimized. Another advantage is that the present invention requires less calls. For example, to find a file in the UnionFS system, the system often must make two calls to open a file system call: one to the file in the private area and, in case of negative response, another one for the file in the shared tree. In contrast, the computer system of the present invention may use a single call because all redirection is made on the underlying file system driver level.

The present invention also provides a number of advantages over prior art file systems that require multiple searches or use system snapshots and record changes to different sub-trees at different times, such as MFS (Mirage File System), discussed above. For example, the present invention utilizes links that allow the system to conduct a single search. Accordingly, the present invention utilizes less system resources, e.g., the present invention does not need to cache additional directory entries in a file system cache to deal with the additional file paths associated with system snapshots.

Moreover, the present invention does not use a full duplex of the structure of intermediate data structures of the file system tree and can work with the file system without formal inodes structures, such as, for example, the Linux journalling file system called "ReiserFS." Moreover, the present invention is not limited to operating at the level of the block data storage and the algorithms of data distribution on the disk, but, rather, at the level of files and pointers to those files. As a result, it is possible to use practically any underlying file system in the present invention.

Having thus described a preferred embodiment of a system and method for providing file-sharing in a computer system to allow multi-user access, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer system for providing access to shareable files of a plurality of local user processes, comprising:
    an operating system;
    a processor;
    a file system locally mounted in the operating system;
    the plurality of local user processes running locally in the computer system under control of the operating system;
    each user of a plurality of users having at least one corresponding local user process;
    a sharable file tree storing each shareable file having a file path;
    the file system receiving a first local user process request for accessing a shareable file but not to modify the shareable file, the accessing is being executed by using any local user process of the plurality of the local user processes, wherein each shareable file of the shareable files is being accessible using file system calls, and said each shareable file is stored in a file storage memory location;
    the computer system separately creating, for each user of the plurality of users, a user file tree, the user file tree is linked with the shareable file tree, and with local user processes, the shareable file tree mounted locally in the file system, wherein the user file tree comprises at least one link inside the file system, wherein the link is connected with a file path of a referenced file accessible using the file system calls of the operating system, such that the user file tree points to the referenced file in response to a local user process for a request to access a file;

multiple user file trees and the shareable file tree have a same mounting point;

said computer system allowing each user of a private file area to define a permitted access to a selected shareable file without copying the selected shareable file into a user's private file area, and accessing only files in a file linked with the mounting point corresponding to the user's private file area;

wherein each user's private file area storing a file accessible using the file system calls of the operating system, but there are no paths for other user's local user processes to access files from any other local user's private file area of the computer system by using the file system calls of the operating system, and the file system deletes a selected private file stored in the private file area, deletes a link connected to the selected private file in the user file tree upon receiving a second local user process request.

2. The computer system of claim 1, wherein the user file tree is initially populated with links corresponding to the file path of a selected number of shareable files, such that the user file tree points to a selected shareable file in response to a request to access the selected shareable file but not to modify the shareable file.

3. The computer system of claim 2, wherein the user file tree is initially populated with one or more links corresponding to the file paths to the shareable files.

4. The computer system of claim 1, wherein the operating system copies a selected shareable file to a private file area associated with one of the plurality of users and modifies the user file tree associated with that user such that the link associated with the selected shareable file, points to the copy of the selected shareable file instead of the selected shareable file, in response to an attempt to modify the selected shareable file.

5. The computer system of claim 4, wherein the modification of the user tree is transparent to the user.

6. The computer system of claim 1, wherein at least one private file area is associated with a selected set of the plurality of users.

7. The computer system of claim 6, wherein the selected set of the plurality of users is associated with the operating system.

8. The computer system of claim 1, wherein the private file areas store files that do not comprise a link to either the user file tree or the shareable file tree.

9. The computer system of claim 1, wherein the user file tree further comprises metadata.

10. The computer system of claim 9, wherein a link located in the user file tree further comprises the metadata.

11. The computer system of claim 10, wherein the metadata comprises data associated with the user file tree.

12. The computer system of claim 1, wherein the links are files.

13. A method for providing access to shareable files in a computer network to a plurality of local user processes, comprising the steps of:

initializing an operating system;

mounting a file system locally in the operating system;

running locally the plurality of local user processes in the computer system under control of the operating system;

instantiating a plurality of users, each user of the plurality of users having at least one corresponding local user process;

storing each shareable file having a file path in a sharable file tree;

receiving a first local user process request for accessing the shareable files but not to modify the shareable files, the accessing of the shareable files are being executed by using any local user process of the plurality of the local user processes, wherein each shareable file of the shareable files is accessible using file system calls and is stored in a file storage memory location;

creating separately, for each user of the plurality of users, a user file tree, the user file tree is being linked with the shareable file tree, and with local user processes, the shareable file tree mounted locally in the file system, wherein the user file tree further comprises at least one link inside the file system, wherein the link is connected with a file path of a referenced file accessible using file system calls of the operating system, such that the user file tree points to the referenced file in response to a local user process for a request to access a file, and wherein multiple user file trees and the shareable file tree have a same mounting point;

allowing each user of a private file area to define a permitted access to a selected shareable file without copying the selected shareable file into a user's private file area;

accessing only files in a file linked with the mounting point corresponding to the user's private file area, wherein each user's private file area stores a file accessible using the file system calls of the operating system, but there are no paths for other user's local user processes to access files from any other local user's private file area of the computer system by using the file system calls of the operating system;

receiving a second local user process request to delete a selected private file stored in the private file area; and deleting the selected private file and deleting a link that is connected to the private file in the user file tree upon response to the second local user process request.

14. The method of claim 13, further comprising the steps of:

receiving a local user process request to access a selected shareable file to modify the shareable file;

copying the selected shareable file into the private file area associated with the user;

modifying the user file tree associated with the user such that a link associated with the selected shareable file point to the copy of the selected shareable file located in the private file area associated with the user.

15. The method of claim 13, further comprising the steps of:

receiving a local user process request to delete a selected private file stored in the private file area, wherein the selected private file is not associated with a link; and deleting the selected private file in response to the local user process request to delete the selected private file.

16. The method of claim 13, wherein the step of creating a private file area further comprises the step of creating a private file area associated with a selected set of the plurality of users.

17. The method of claim 13, further comprising the step of creating a metadata associated with a selected one of links associated with a shareable file in the shareable file tree.

18. The method of claim 13, wherein the links are files.

19. The method of claim 13, wherein the operating system isolates the file system access for the local user processes to allow the local user processes to access any of the file path of the shareable file and the file path of a file from the private file area associated with the local user processes owned by that user.

20. A computer system for providing access to shareable files of a plurality of local user processes, comprising:
- a processor;
- an operating system;
- a local file system locally accessible by the operating system;
- a plurality of users, each user of the plurality of users having a corresponding local user process;
- the local user processes running locally in the computer system under control of the operating system;
- a sharable file tree storing each shareable file having a file path;
- the computer system maintains only one version of any shareable file;
- the file system receives a first local user process request for accessing a shareable file but not to modify the shareable file, the accessing is being executed by using any local user process of the plurality of the local user processes, wherein each shareable file of the shareable files is being accessible using file system calls, and said each shareable file is stored in a file storage memory location;
- the computer system separately creating, for each user of the plurality of users, a user file tree, the user file tree is linked with the shareable file tree, and with local user processes, the shareable file tree mounted locally in the file system, wherein the user file tree comprises at least one link inside the file system, wherein the link is connected to a file path of a referenced file accessible using the file system calls of the operating system, such that the user file tree points to the referenced file in response to a local user process for a request to access a file;
- multiple user file trees and the shareable file tree have a same mounting point;
- said computer system allowing each user of a private file area to define a permitted access to a selected shareable file without copying the selected shareable file into a user's private file area, and accessing only files in a file linked with the mounting point corresponding to the user's private file area;
- wherein each user's private file area storing a file accessible using the file system calls of the operating system, but there are no paths for other user's local user processes to access files from any other local user's private file area of the computer system by using the file system calls of the operating system, and
- the file system deletes a selected private file stored in the private file area, deletes a link connected to the selected private file in the user file tree upon receiving a second local user process request.

* * * * *